(12) United States Patent
Wei et al.

(10) Patent No.: US 11,450,857 B2
(45) Date of Patent: Sep. 20, 2022

(54) CURRENT COLLECTOR WITH INSULATING SUBSTRATE AND CONDUCTIVE LAYER, ELECTRODE PLATE USING THE SAME, AND ELECTRODE ASSEMBLY USING THE SAME

(71) Applicant: Ningde Amperex Technology Ltd., Ningde (CN)

(72) Inventors: Hongmei Wei, Ningde (CN); Bin Wang, Ningde (CN); Li Xiang, Ningde (CN); Yi-Bo Zhang, Ningde (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 128 days.

(21) Appl. No.: 16/527,158

(22) Filed: Jul. 31, 2019

(65) Prior Publication Data
US 2020/0313197 A1  Oct. 1, 2020

(30) Foreign Application Priority Data
Mar. 29, 2019 (CN) .......................... 201910252846.7

(51) Int. Cl.
*H01M 4/66* (2006.01)
*H01M 4/70* (2006.01)
(Continued)

(52) U.S. Cl.
CPC ............. *H01M 4/667* (2013.01); *H01M 4/70* (2013.01); *H01M 10/0525* (2013.01); *H01M 50/531* (2021.01)

(58) Field of Classification Search
CPC ...... H01M 4/667; H01M 50/531; H01M 4/70; H01M 10/0525
(Continued)

(56) References Cited

U.S. PATENT DOCUMENTS

2005/0284750 A1* 12/2005 Nishimura ........ H01M 10/4235
  204/252
2005/0287428 A1* 12/2005 Cheon ................. H01M 50/538
  429/211
(Continued)

FOREIGN PATENT DOCUMENTS

CN   104170126 A   11/2014
CN   107369837 A   11/2017
(Continued)

OTHER PUBLICATIONS

Office Action dated Mar. 24, 2021, issued in counterpart CN Application No. 201910252846.7, with English Translation. (16 pages).

*Primary Examiner* — Sean P Cullen
(74) *Attorney, Agent, or Firm* — WHDA, LLP (57) ABSTRACT

A current collector for a lithium ion battery of reduced sensitivity to shocks and jars includes an insulating substrate, a first conductive layer; and at least one extended conductive layer extending from the first conductive layer. The insulating substrate has a main region and at least one tab region extending therefrom. The main region includes first and second surfaces opposing each other. The tab region includes a first extended surface extending from the first surface, and a second extended surface extending from the second surface. The first conductive layer covers the first surface, and the at least one extended conductive layer covers the first extended surface. Each tab region and extended conductive layer form a tab. The disclosure also provides an electrode plate and an electrode assembly.

14 Claims, 10 Drawing Sheets

(51) Int. Cl.
*H01M 10/0525* (2010.01)
*H01M 50/531* (2021.01)

(58) Field of Classification Search
USPC .................................................. 429/234, 236
See application file for complete search history.

(56) References Cited

U.S. PATENT DOCUMENTS

| | | | | |
|---|---|---|---|---|
| 2006/0105243 A1* | 5/2006 | Okamura | ................ | H01M 4/64 429/234 |
| 2012/0315537 A1* | 12/2012 | Ravdel | ................. | H01M 4/668 429/209 |
| 2012/0328921 A1* | 12/2012 | Kawaoka | ................ | H01M 4/70 429/94 |
| 2013/0177787 A1* | 7/2013 | Arima | ................. | H01M 50/581 429/62 |
| 2019/0157656 A1* | 5/2019 | Li | .................... | H01M 10/0525 |

FOREIGN PATENT DOCUMENTS

| | | | | |
|---|---|---|---|---|
| CN | 108767262 A | 11/2018 | | |
| EP | 2802029 A1 | 11/2014 | | |
| JP | 10241699 A | * 9/1998 | | |
| JP | 2012129114 A | * 7/2012 | ........ | H01M 10/0585 |
| JP | 2012155974 A | * 8/2012 | ............ | H01M 4/668 |
| KR | 2008016047 A | * 2/2008 | | |
| WO | 2012/081368 A1 | 6/2012 | | |
| WO | WO-2020168879 A1 | * 8/2020 | ............. | H01M 4/13 |

\* cited by examiner

CURRENT COLLECTOR WITH INSULATING SUBSTRATE AND CONDUCTIVE LAYER, ELECTRODE PLATE USING THE SAME, AND ELECTRODE ASSEMBLY USING THE SAME

FIELD

The subject matter herein generally relates to batteries, in particular, to a current collector, an electrode plate using the current collector, and an electrode assembly using the electrode plate.

BACKGROUND

A lithium ion battery has high capacity, high energy density, long service life, high operating voltage, low self-discharge rate, small size, and light weight, and thus being widely applied in the consumer electronics area. Demand for capacity, energy density, safety, and cyclic performance of the batteries is growing. But, there remains room for improvement, for example, in order to avoid short circuits between the bending tab and the electrode plate in the battery, the distance between the bending tab and the main body of the electrode plate is increased. However, when the battery is impacted or dropped, the tab can easily make contact with the main body of the electrode plate, and the battery is short-circuited.

What is needed in the battery is a current collector, an electrode plate and an electrode assembly with improved safety features and reliability.

SUMMARY

A current collector includes an insulating substrate, a first conductive layer; and at least one extended conductive layer extending from the first conductive layer. The insulating substrate includes a main region and at least one tab region extending outwardly from an end portion of the main region. The main region includes a first surface and a second surface facing away from the first surface. The at least one tab region includes a first extended surface extending from the first surface, and a second extended surface extending from the second surface. The first conductive layer covers the first surface, and the at least one extended conductive layer covers the first extended surface. Each of the at least one tab region and the corresponding extended conductive layer form a tab.

Further, the current collector further has at least one communicating hole passing through the main region or passing through the main region and the first conductive layer.

Further, a conductive structure is infilled in each of the at least one communicating hole.

Further, the current collector further comprises a second conductive layer covering the second surface, the second extended surface is not provided with the second conductive layer.

Further, the current collector further has at least one communicating hole passing through the main region, or passing through the main region and at least one of the first conductive layer and the second conductive layer.

Further, the current collector further has at least one connecting hole passing through the tab region or passing through the tab region and the extended conductive layer.

Further, a conductive structure is infilled in the at least one connecting hole away from the main region.

Further, the current collector comprises a plurality of spaced tabs.

An electrode plate includes an active layer and a current collector. The current collector includes an insulating substrate, a first conductive layer; and at least one extended conductive layer extending from the first conductive layer. The insulating substrate includes a main region and at least one tab region extending outwardly from an end portion of the main region. The main region includes a first surface and a second surface facing away from the first surface. The at least one tab region includes a first extended surface extending from the first surface, and a second extended surface extending from the second surface. The first conductive layer covers the first surface, and the at least one extended conductive layer covers the first extended surface. Each of the at least one tab region and the corresponding extended conductive layer form a tab. The active layer is disposed on a surface of the first conductive layer facing away from the insulating substrate.

An electrode assembly includes a first electrode plate, a second electrode plate, and a separator sandwiched between the first electrode plate and the second electrode plate. The first electrode plate, the separator, and the second electrode plate are stacked or wound to form the electrode assembly. At least one of the first electrode plate and the second electrode plate includes an active layer and a current collector. The current collector includes an insulating substrate, a first conductive layer; and at least one extended conductive layer extending from the first conductive layer. The insulating substrate includes a main region and at least one tab region extending outwardly from an end portion of the main region. The main region includes a first surface and a second surface facing away from the first surface. The at least one tab region includes a first extended surface extending from the first surface, and a second extended surface extending from the second surface. The first conductive layer covers the first surface, and the at least one extended conductive layer covers the first extended surface. Each of the at least one tab region and the corresponding extended conductive layer form a tab. The active layer is disposed on a surface of the first conductive layer facing away from the insulating substrate.

Since the current collector includes at least one tab formed by the tab region and the extended conductive layer, the risk of impact breakage can be reduced in addition to avoiding short circuits when the tabs are bent. Thus, the stability and safety of the electrode assembly or the battery are improved, and the service life of the battery is prolonged.

Moreover, by defining at least one of the communicating hole and the connecting hole, the weight of the current collector is reduced, which more easily allows deformation of the current collector, in being bent or in being wound.

Furthermore, when the conductive structure is infilled in the communicating hole, the first conductive layer and the second conductive layer are electrically connected with each other, thereby enhancing the current-carrying capability of the current collector.

When the conductive structure is infilled in the connecting hole away from the main region, the electrical connection between the tabs can be achieved by the conductive structure, which simplifies the process.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 1:
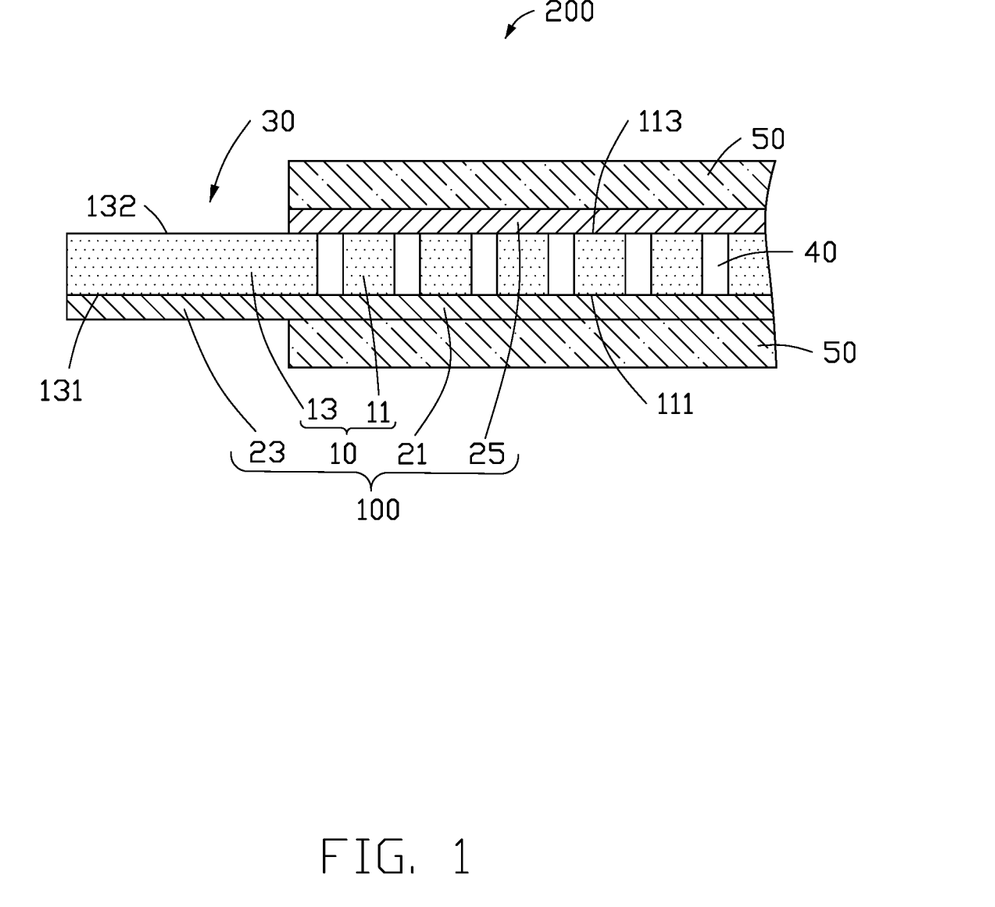
FIG. 1 is a cross-sectional view of an embodiment of an electrode plate.

FIG. 1 illustrates an embodiment of a current collector 100. The current collector 100 includes an insulating substrate 10, a first conductive layer 21, and at least one extended conductive layer 23.

The insulating substrate 10 includes a main region 11 and at least one tab region 13. Each tab region 13 extends outwardly from an end portion of the main region 11.

In at least one embodiment, a thickness of the insulating substrate 10 is preferably 1 µm to 15 µm. Ideally, the thickness of the insulating substrate 10 is 5 µm.

The main region 11 includes a first surface 111 and a second surface 113 facing away from the first surface 111.

The tab region 13 includes a first extended surface 131 and a second extended surface 132. The first extended surface 131 extends from the first surface 111, and the second extended surface 132 extends from the second surface 113.

The first conductive layer 21 covers the first surface 111. Each extended conductive layer 23 extends from the first conductive layer 21 and covers the first extended surface 131. Each tab region 13 and the extended conductive layer 23 corresponding to the tab region 13 together form a tab 30.

In at least one embodiment, the current collector 100 may further define at least one communicating hole 40. Referring to FIG. 1, each communicating hole 40 passes through the main region 11. In at least one embodiment, each communicating hole 40 may pass through the main region 11 and the first conductive layer 21.

In at least one embodiment, a diameter of each communicating hole 40 is between 50 µm and 3000 µm. The count per area of the at least one communicating hole 40 is between 1 per square centimeter and 25 per square centimeter. That is, the at least one communicating hole 40 has a density of 1 per square centimeter to 25 per square centimeter. In another embodiment, the diameter of each communicating hole 40 and the density of the at least one communicating hole 40 may be varied as needed.

Figure 2:
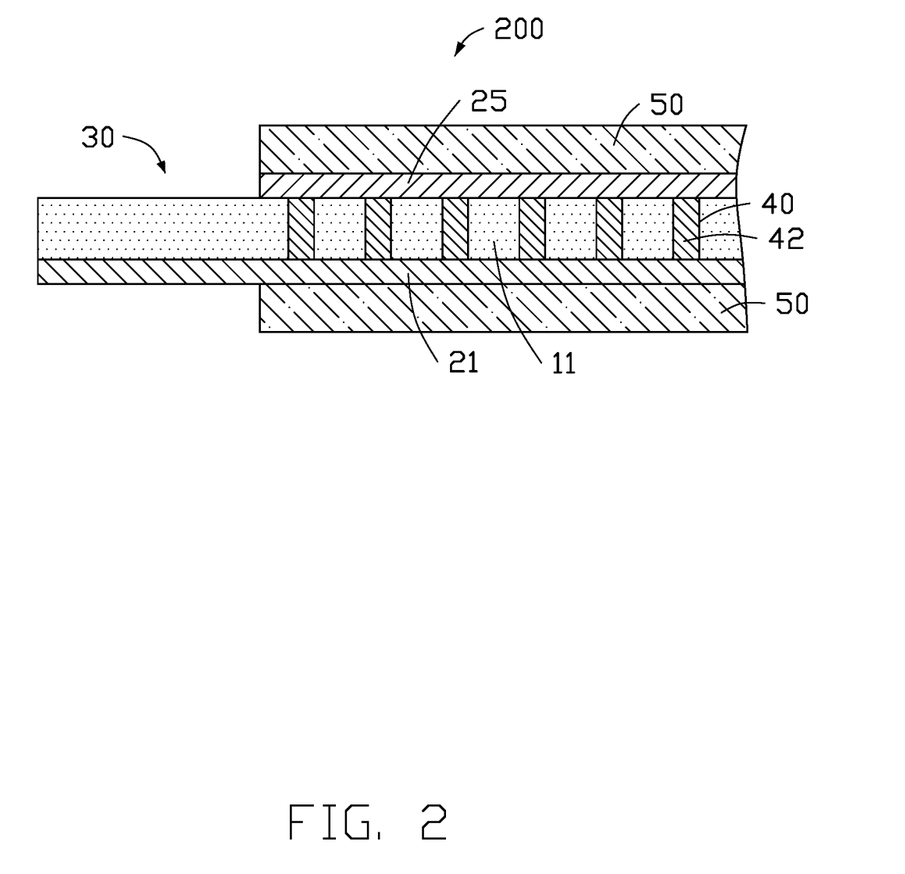
FIG. 2 is a cross-sectional view of an embodiment of an electrode plate.

In at least one embodiment, referring to FIG. 2, a conductive structure 42 is infilled in the communicating hole 40 to electrically connect with the first conductive layer 21. The conductive structure 42 may be made of conductive particles, conductive adhesive, conductive paste, or a metal layer.

In at least one embodiment, the current collector 100 may further include a second conductive layer 25. The second conductive layer 25 is disposed on the second surface 113 but not on the second extended surface 132. That is, in the current collector 100, the second extended surface 132 is not provided with the second conductive layer 25.

In at least one embodiment, the communicating hole 40 may electrically connect the first conductive layer 21 and the second conductive layer 25.

In at least one embodiment, the communicating hole 40 may further pass through the second conductive layer 25. In an embodiment, referring to FIG. 3, the communicating hole 40 passes through the first conductive layer 21, the main region 11, and the second conductive layer 25.

Figure 4:
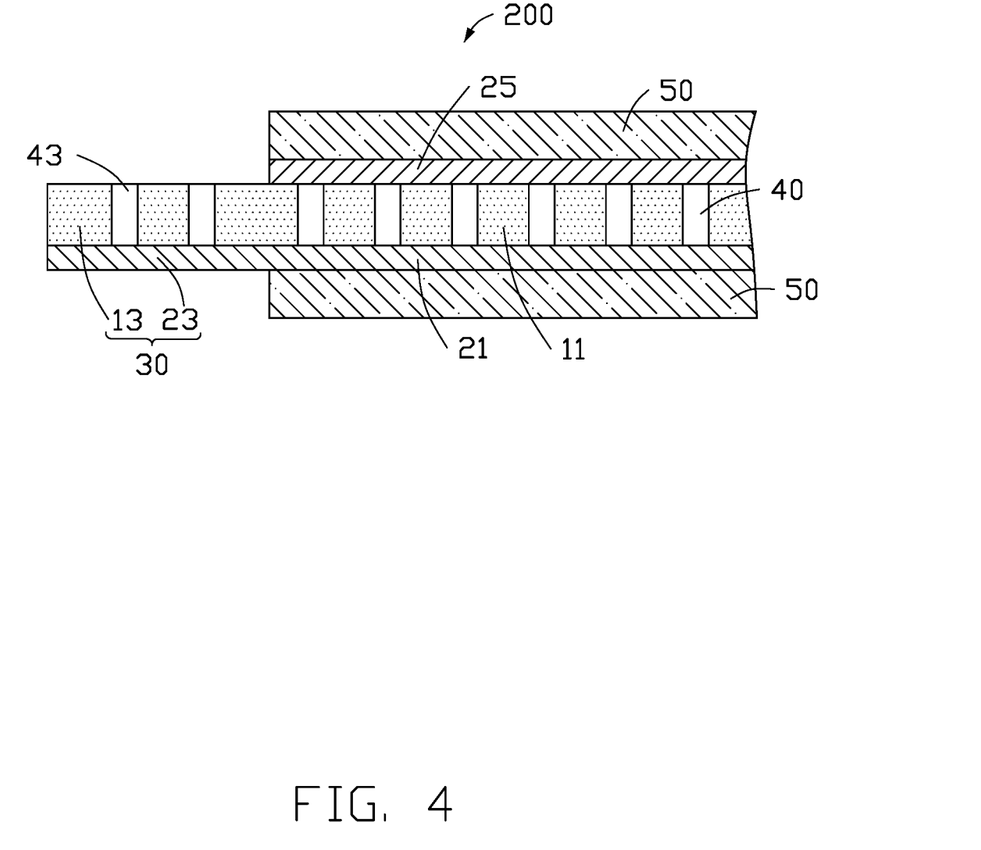
FIG. 4 is a cross-sectional view of an embodiment of an electrode plate.

In at least one embodiment, referring to FIG. 4, the current collector 100 may further include at least one connecting hole 43. Each connecting hole 43 passes through the tab region 13. In at least one embodiment, each connecting hole 43 may pass through the tab region 13 and the extended conductive layer 23.

Preferably, a diameter of each connecting hole 43 is 500 µm. The at least one connecting hole 43 has a density of 10 per square centimeter. In another embodiment, the diameter of each connecting hole 43 and the density of the at least one connecting hole 43 may be varied as needed.

Figure 5:
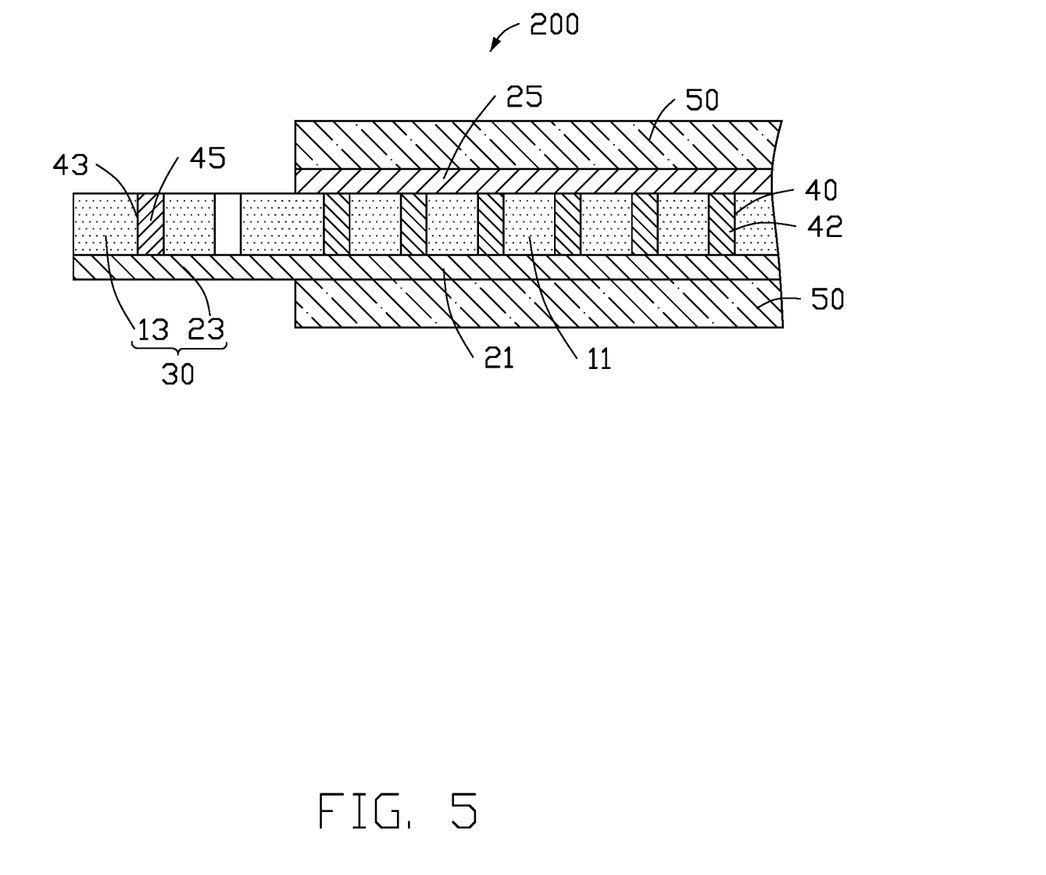
FIG. 5 is a cross-sectional view of an embodiment of an electrode plate.

Referring to FIG. 5, a conductive structure 45 is infilled in the connecting hole 43 away from the main region 11 to electrically connect with the extended conductive layer 23.

Figure 6:
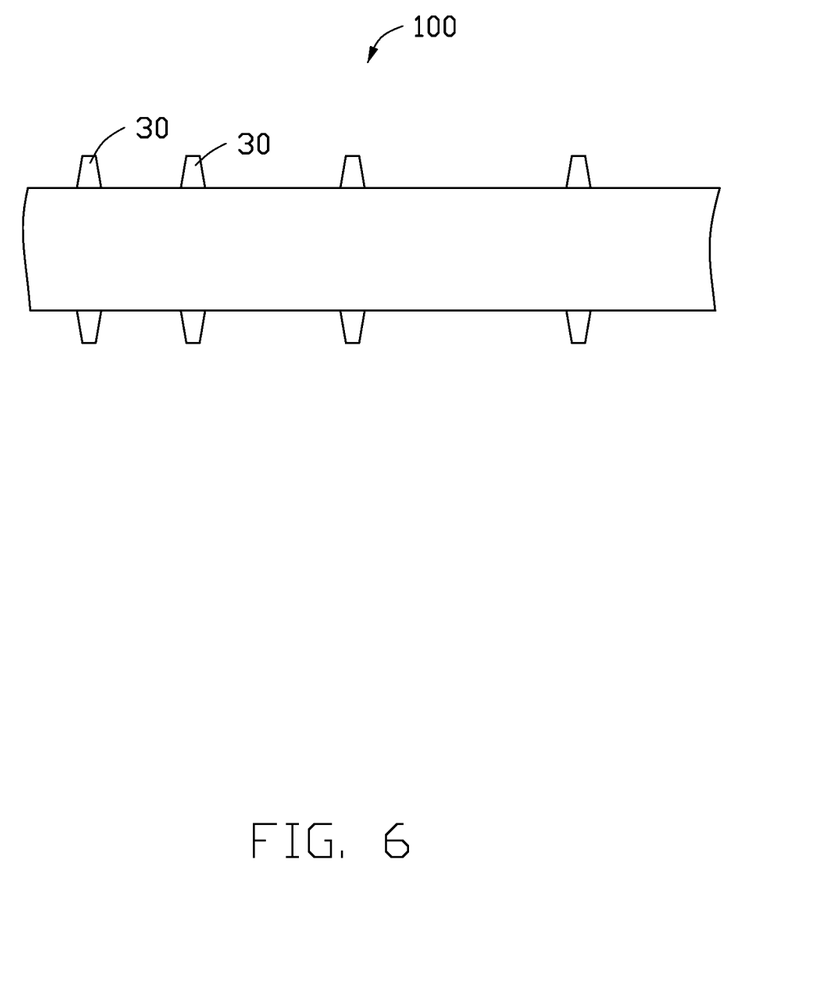
FIG. 6 is a diagram of an embodiment of an electrode plate.

In at least one embodiment, referring to FIG. 6, the current collector 100 may include a plurality of spaced tabs 30.

FIG. 1 shows an embodiment of the current collector 100 applied in an electrode plate 200. The electrode plate 200 further includes an active layer 50 disposed on the current collector 100. In the illustrated embodiment, the active layer 50 is disposed on a surface of the first conductive layer 21 facing away from the insulating substrate 10.

In at least one embodiment, the active layer 50 may be further formed on a surface of the second conductive layer 25 facing away from the insulating substrate 10.

The current collector 100 applied in an electrode plate 200 can be any of the embodiments described above and as shown in FIGS. 2-6.

Figure 3:
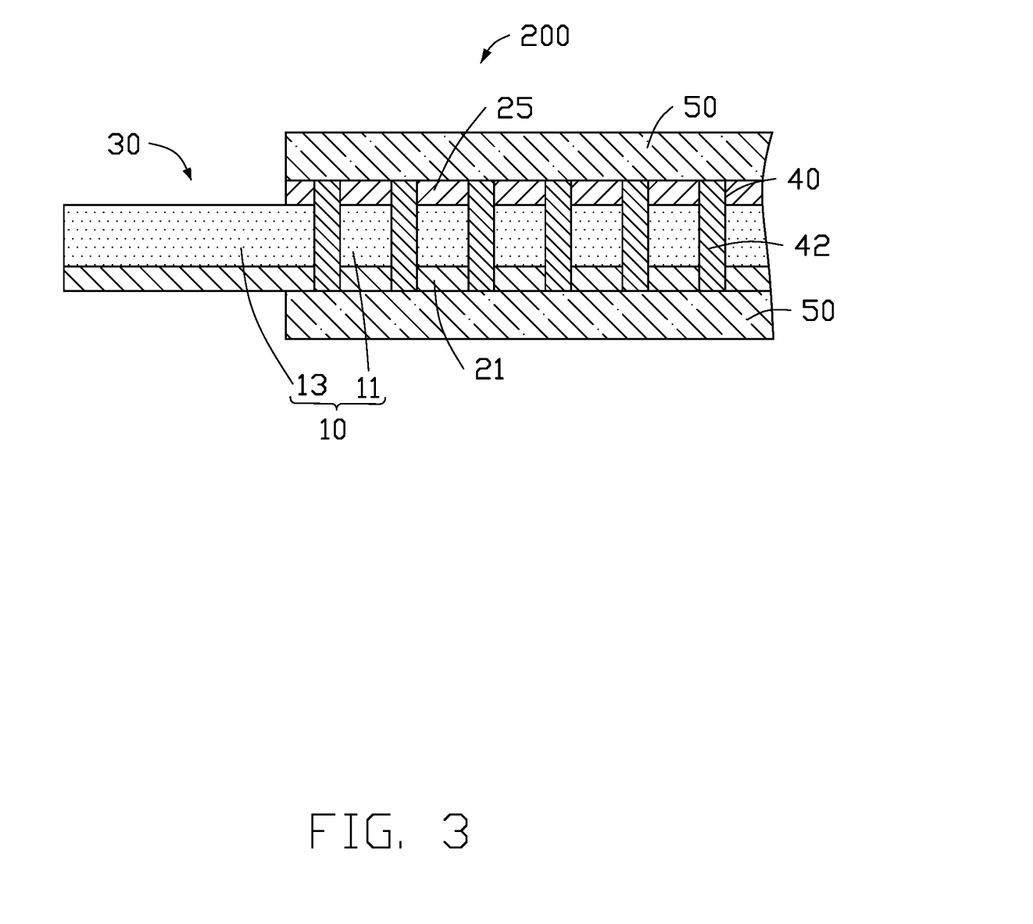
FIG. 3 is a cross-sectional view of an embodiment of an electrode plate.
Figure 7:
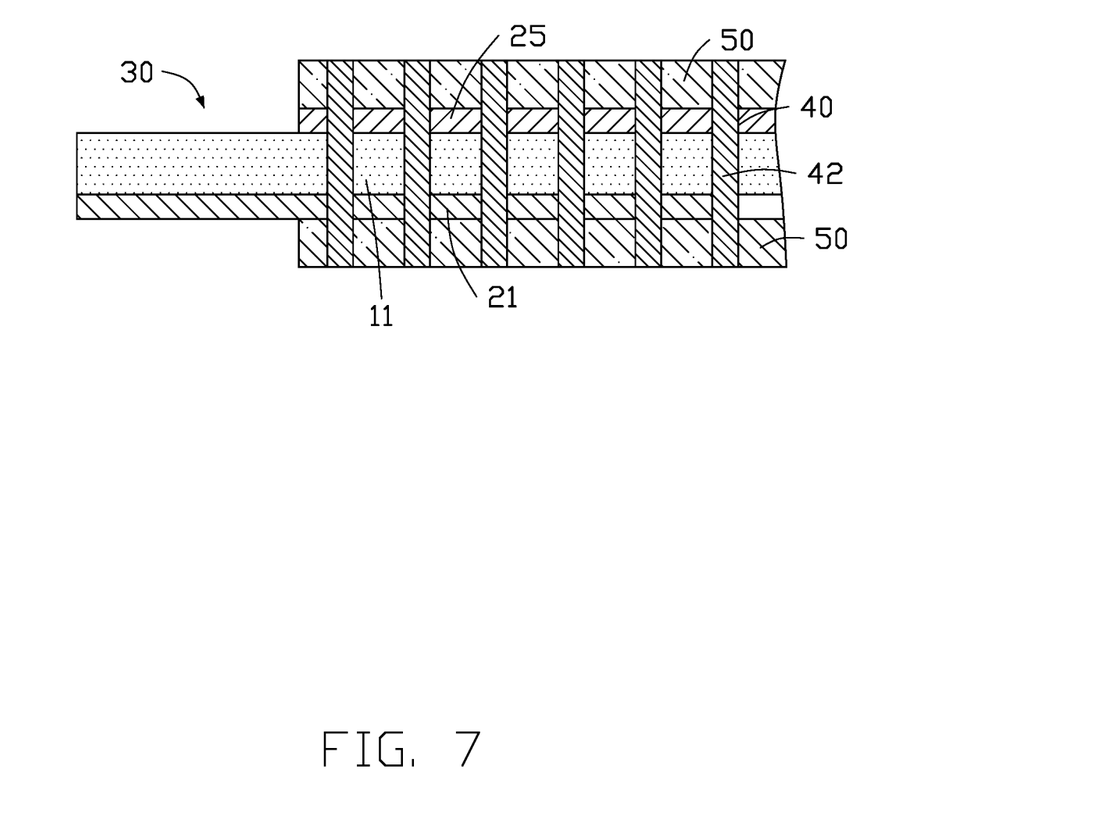
FIG. 7 is a cross-sectional view of an embodiment of an electrode plate.

FIG. 7 shows an electrode plate different from the electrode plate of the embodiment shown in FIG. 3. The communicating hole 40 may further pass through the active layer 50. Specifically, the communicating hole 40 may further pass through the active layer 50 formed on the surface of the first conductive layer 21 facing away from the insulating substrate 10 and the active layer 50 formed on the surface of the second conductive layer 25 facing away from the insulating substrate 10, or one of them.

Figure 8:
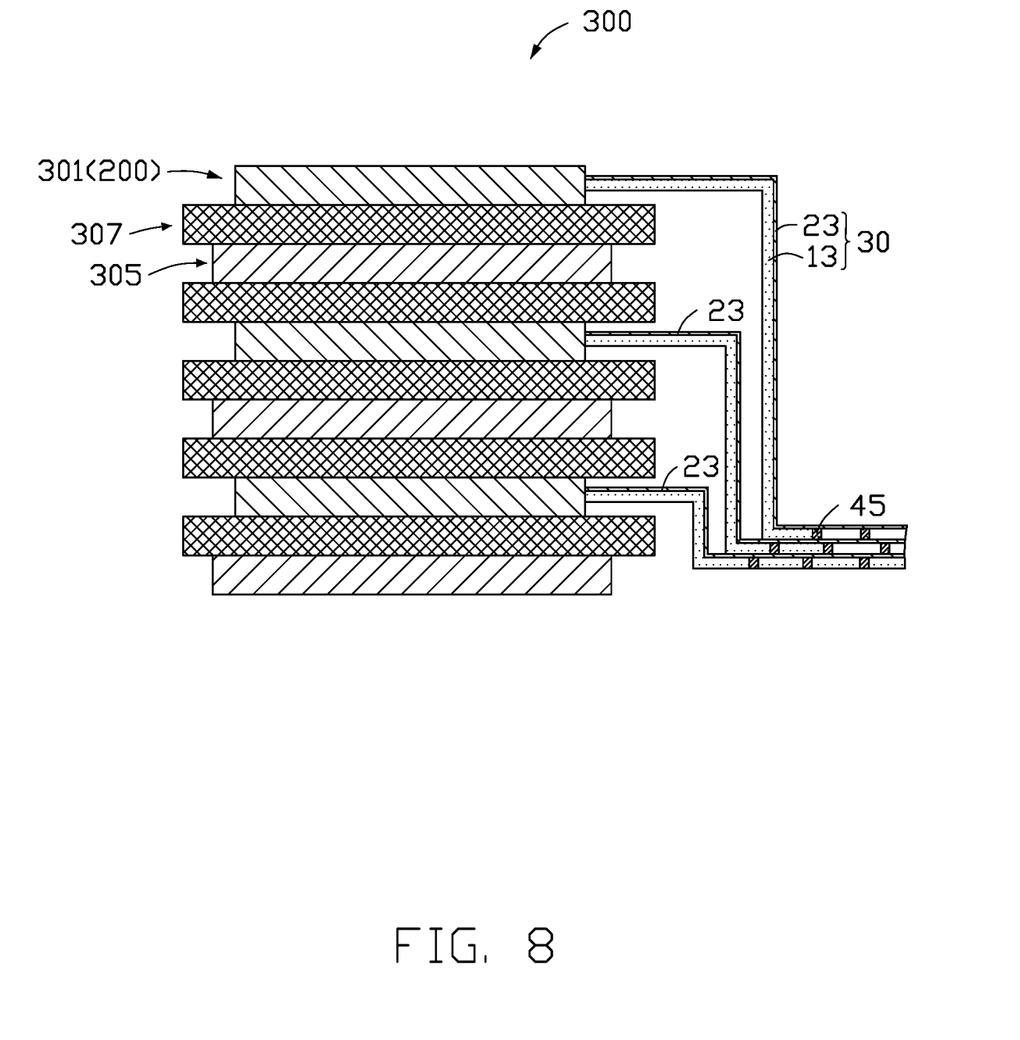
FIG. 8 is a cross-sectional view of an embodiment of an electrode assembly.

FIG. 8 shows an embodiment of the electrode plate 200 applied in an electrode assembly 300. The electrode assembly 300 includes at least one first electrode plate 301, at least one second electrode plate 305 and at least one separator 307. Each separator 307 is sandwiched between one of the at least one first electrode plate 301 and the adjacent second electrode plate 305. In at least one embodiment, at least one first electrode plate 301 can be any of the embodiments described above and as shown in FIGS. 1-7.

The first electrode plate 301 can be a positive electrode plate or a negative electrode plate.

The electrode assembly 300 can be a stacked electrode assembly or a wound electrode assembly.

Figure 9:
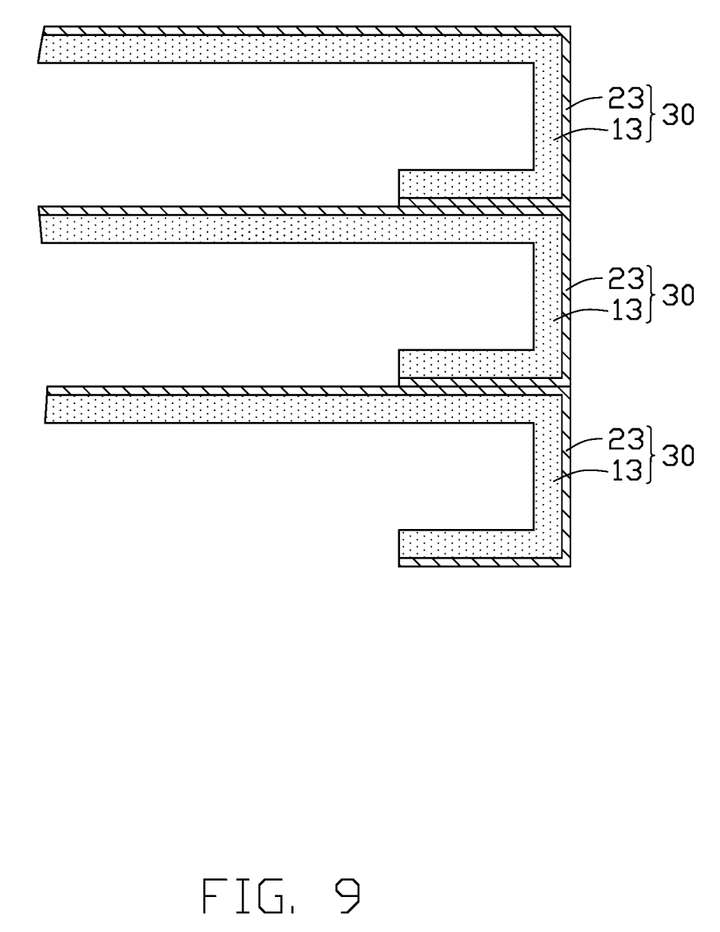
FIG. 9 is a cross-sectional view of an embodiment of an electrical connection between tabs.

The tab 30 of the first electrode plate 301 (200) is bent and soldered to the other tabs.

referring to FIG. 8, an electrical connection between the tabs 30 can be achieved by the conductive structure 45 in one tab 30 being in contact with the extended conductive layer 23 in another tab 30. Referring to FIG. 9, the extended conductive layers 23 of the tabs 30 can also be soldered to achieve electrical connection between the tabs 30.

Figure 10:
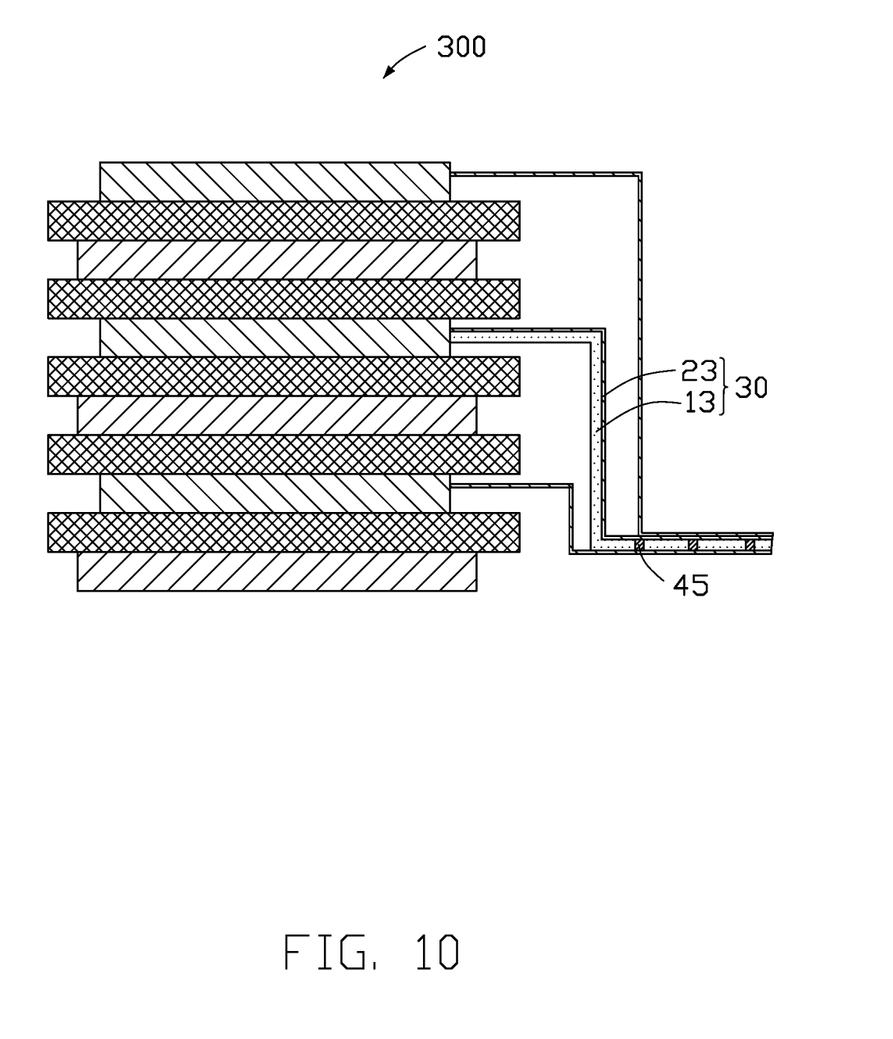
FIG. 10 is a cross-sectional view of an embodiment of an electrode assembly.

Referring to FIG. 10, an electrical connection between the tab 30 and other tabs may be achieved by at least one of the conductive structure 45 of the tab 30 and the extended conductive layers 23 of the tab 30, or may be achieved by soldering.

Embodiment 1

A current collector 100 and an electrode assembly with the current collector 100 can be prepared by the following steps.

Current collector preparation: an insulating substrate made of polyethylene terephthalate (PET) and having a thickness of 5 μm was provided. The insulating substrate included a main region and at least one tab region extending outwardly from an end portion of the main region. Two metallic layers (such as of aluminum or copper) were formed on two opposite surfaces of the main region of the insulating substrate by vacuum deposition, as a first conductive layer and a second conductive layer. The thickness of each metallic layer was 0.5 μm. An extended conductive layer (such as of aluminum or copper) was formed on a surface of the tab region by vacuum deposition. The thickness of the extended conductive layer was 0.5 μm. Communicating holes were defined by laser to pass through the second conductive layer and the insulating substrate. The diameter of each communicating hole was 500 μm, and the density of the communicating holes was 5 per square centimeter. The area of the communicating holes on the two opposite surfaces accounted for 2.0 percent of the total area of the two opposite surfaces. A first slurry was provided by adding N-methyl pyrrolidone (NMP) into conductive carbon powders and stirring. The solid content of the first slurry was 50 percent. The first slurry was coated on the second conductive layer and infilled the communicating holes, and dried at a temperature of 90° C., thereby obtaining the current collector.

Positive electrode plate preparation: a second slurry was provided by mixing LiCoO$_2$, Super P, and PVDF at a weight ratio of 97.5:1.0:1.5, adding NMP and stirring. The solid content of the second slurry was 75 percent. The second slurry was coated onto the first conductive layer and the second conductive layer to form two positive active layers. The density of active material in the positive active layers was 180 g/m$^2$. The positive active layers were dried at a temperature of 90° C., and the density of the active material in the positive active layers was cold pressed to 4.1 g/m$^2$. The positive tabs were formed by laser cutting, thereby forming the positive electrode plate.

Negative electrode plate preparation: a third slurry was provided by mixing graphite, Super P, and styrene-butadiene rubber at a weight ratio of 96:1.5:2.5, adding deionized water and stirring. The solid content of the third slurry was 70 percent. The third slurry was coated onto another current collector to form two negative active layers. The density of active material in the negative active layers was 95 g/m$^2$. The negative active layers were dried at a temperature of 110° C., and the density of the active material in the negative active layers was cold pressed to 1.7 g/m$^2$. The negative tabs were formed by laser cutting, thereby forming the negative electrode plate.

One of the positive tabs was formed by the tab region and the extended conductive layer, the other positive tabs were formed by the extended conductive layer. One of the negative tabs was formed by the tab region and the extended conductive layer, the other negative tabs were formed by the extended conductive layer. The positive tab formed by the tab region and the extended conductive layer and the negative tab formed by the tab region and the extended conductive layer were located at the outermost side when bending the positive tabs and the negative tabs, this was to reduce the risk of short circuit during the bending process.

Electrolyte preparation: an organic solvent was provided by mixing EC, EMC, and DEC at a mass ratio of 30:50:20. The electrolyte was prepared by adding LiPF$_6$ as lithium salt in the organic solvent to dissolve and be stirred. The concentration of the lithium salt in the electrolyte was 1.15M.

Battery preparation: the positive electrode plate, a separator, and the negative electrode plate were stacked or wound to form an electrode assembly. The separator was a polyethylene film having a thickness of 15 μm. The positive tabs and the negative tabs were bent and soldered. After bending, a distance between the positive electrode plate and the negative tab formed by the tab region and the extended conductive layer was less than a distance between the positive electrode plate and the other negative tabs. A maximum height of the bending region of the other negative tabs to the adjacent positive electrode plate was 2 mm. A maximum height of the bending region of the positive tabs to the adjacent positive electrode plate was 2 mm. The electrode assembly was received in an aluminum plastic film, and the electrolyte was injected into the aluminum plastic film. Then the electrode assembly and the electrolyte were encapsulated by a packaging film to form a product. A gap in the product between the top of the packaging film and at least one of the end portion of the positive electrode plate and the end portion of the negative electrode plate was 2.2 mm. The electrode assembly was formatted by being charged to 3.3V with a constant current of 0.02 C; then charged to 3.6V with a constant current of 0.1 C, thereby obtaining the final battery.

Embodiment 2

Different from the above EMBODIMENT 1, the number of positive tabs formed by the tab region and the extended conductive layer and the number of negative tabs formed by the tab region and the extended conductive layer accounted for 25 percent of the total numbers of the positive tabs and the negative tabs in the battery.

Embodiment 3

Different from the above EMBODIMENT 1, the number of positive tabs formed by the tab region and the extended conductive layer and the number of negative tabs formed by the tab region and the extended conductive layer accounted for 50 percent of the total numbers of the positive tabs and the negative tabs in the battery.

Embodiment 4

Different from the above EMBODIMENT 1, each of the positive tabs and the negative tabs in the battery was formed by the tab region and the extended conductive layer.

Embodiment 5

Different from the above EMBODIMENT 4, a maximum height of the bending region of the positive tabs to the adjacent positive electrode plate was 1.5 mm, and a maximum height of the bending region of the other negative tabs to the adjacent positive electrode plate was 1.5 mm.

Embodiment 6

Different from the above EMBODIMENT 4, a maximum height of the bending region of the positive tabs to the adjacent positive electrode plate was 0.7 mm, and a maximum height of the bending region of the other negative tabs to the adjacent positive electrode plate was 0.7 mm.

Embodiment 7

Different from the above EMBODIMENT 4, a maximum height of the bending region of the positive tabs to the adjacent positive electrode plate was 0.2 mm, and a maximum height of the bending region of the other negative tabs to the adjacent positive electrode plate was 0.2 mm.

Embodiment 8

Different from the above EMBODIMENT 7, the gap in the product between the top of the packaging film and at least one of the end portion of the positive electrode plate and the end portion of the negative electrode plate was 1.7 mm.

Embodiment 9

Different from the above EMBODIMENT 7, the gap in the product between the top of the packaging film and at least one of the end portion of the positive electrode plate and the end portion of the negative electrode plate was 0.9 mm.

Embodiment 10

Different from the above EMBODIMENT 7, the gap in the product between the top of the packaging film and at least one of the end portion of the positive electrode plate and the end portion of the negative electrode plate was 0.3 mm.

Embodiment 11

Different from the above EMBODIMENT 10, the thickness of the insulating substrate was 1 μm.

Embodiment 12

Different from the above EMBODIMENT 10, the thickness of the insulating substrate was 5 μm.

Embodiment 13

Different from the above EMBODIMENT 10, the thickness of the extended conductive layer was 40 percent of the thickness of the insulating substrate. In the illustrated embodiment, the thickness of the extended conductive layer was 2 μm.

Embodiment 14

Different from the above EMBODIMENT 10, the thickness of the extended conductive layer was 70 percent of the thickness of the insulating substrate. In the illustrated embodiment, the thickness of the extended conductive layer was 3.5 μm.

Embodiment 15

Different from the above EMBODIMENT 10, the diameter of each communicating hole was 50 μm.

Embodiment 16

Different from the above EMBODIMENT 10, the diameter of each communicating hole was 3000 μm.

Embodiment 17

Different from the above EMBODIMENT 10, the density of communicating holes was 1 per square centimeter.

Embodiment 18

Different from the above EMBODIMENT 10, the density of communicating holes was 25 per square centimeter.

Embodiment 19

Different from the above EMBODIMENT 10, the first slurry further included metallic particles. The solid content of the first slurry was about 70 percent. In the illustrated embodiment, aluminum particles and PVDF at a weight ratio of 95:5 were added in a turbid liquid including NMP and conductive carbon powders to form the first slurry having the solid content of 73 percent used in the positive electrode plate. Each aluminum particle had a diameter of 0.7 μm to 20 μm. Copper particles and SBR at a weight ratio of 95:5 were added in a turbid liquid including deionized water and conductive carbon powders to form the first slurry having the solid content of 70 percent used in the negative electrode plate. Each copper particle had a diameter of 0.7 μm to 20 μm.

Embodiment 20

Different from the above EMBODIMENT 10, the first slurry further included a conductive polymeric material. The solid content of the first slurry was about 70 percent. In the illustrated embodiment, PPy particles and PVDF at a weight ratio of 1:10 were added in a turbid liquid including NMP and conductive carbon powders to form the first slurry having the solid content of 73 percent used in the positive electrode plate. Each PPy particle had a diameter of 0.7 μm to 5 μm. PPy particles and SBR at a weight ratio of 1:10 were added in a turbid liquid including deionized water and conductive carbon powders to form the first slurry having the solid content of 70 percent used in the negative electrode plate. Each PPy particle had a diameter of 0.7 μm to 20 μm.

Comparative Embodiment 1

Different from the above EMBODIMENT 1, the thickness of the insulating substrate was 13 μm, and communicating holes were not defined in the insulating substrate. Each of the positive tabs and the negative tabs was formed by the extended conductive layer having a thickness of 0.5 μm. The positive tabs and the negative tabs were encapsulated with rubber after being soldered.

Comparative Embodiment 2

Different from the above EMBODIMENT 1, the thickness of the insulating substrate was 8 μm. Each of the positive tabs and the negative tabs was formed by the extended conductive layer having a thickness of 0.5 μm. The positive tabs and the negative tabs were encapsulated with rubber after being soldered.

Capacity density of each battery of EMBODIMENT 1-20 and COMPARATIVE EMBODIMENT 1-2 were tested when the battery was discharged to 3.8V at 0.2 Coulomb. The test results were shown in the following Table 1.

TABLE 1

|  | Capacity density |
|---|---|
| COMPARATIVE EMBODIMENT 1 | 515 |
| COMPARATIVE EMBODIMENT 2 | 523 |
| EMBODIMENT 1 | 525 |
| EMBODIMENT 2 | 526 |
| EMBODIMENT 3 | 527 |
| EMBODIMENT 4 | 528 |
| EMBODIMENT 5 | 529 |
| EMBODIMENT 6 | 530 |
| EMBODIMENT 7 | 531 |
| EMBODIMENT 8 | 531 |
| EMBODIMENT 9 | 532 |
| EMBODIMENT 10 | 533 |
| EMBODIMENT 11 | 531 |
| EMBODIMENT 12 | 528 |
| EMBODIMENT 13 | 529 |
| EMBODIMENT 14 | 529 |
| EMBODIMENT 15 | 530 |
| EMBODIMENT 16 | 535 |
| EMBODIMENT 17 | 530 |
| EMBODIMENT 18 | 542 |
| EMBODIMENT 19 | 542 |
| EMBODIMENT 20 | 542 |

According to the Table 1, the tab formed by the tab region and the extended conductive layer is not affected by a distance between the tab and the end portion of the electrode plate when the tab is bent. A space between the tab and the end portion of the electrode plate for avoiding short circuits can be reduced or can even be canceled. The gap between the top of the packaging film and the end portion of the electrode plate can also be reduced, thereby increasing the volume capacity density of the electrode assembly.

Since the current collector 100 includes at least one tab formed by the tab region 13 and the extended conductive layer 23, the risk of breakage is reduced in addition to avoiding short circuits when the tabs are bent. Thus, the stability and safety of the electrode assembly or the battery are improved, and the service life of the battery prolonged. Moreover, by defining at least one of the communicating hole 40 and the connecting hole 43, the weight of the current collector 100 is reduced, advantageous for the deformation of the current collector 100, in being bent or in being wound. Furthermore, when the conductive structure 42 is infilled in the communicating hole 40, the first conductive layer 21 and the second conductive layer 25 are electrically connected with each other, thereby enhancing the current-carrying capability of the current collector 100. When the conductive structure 45 is infilled in the connecting hole 43 away from the main region, electrical connections between the tabs can be achieved by the conductive structure 45, which simplifies the process.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A current collector comprising:
an insulating substrate comprising:
a main region comprising a first surface and a second surface facing away from the first surface; and
a tab region extending outwardly from an end portion of the main region, the tab region comprising a first extended surface and a second extended surface, the first extended surface extends from the first surface, and the second extended surface extends from the second surface;
wherein a first conductive layer is formed on the first surface and an extended conductive layer is formed on the first extended surface;
wherein the tab region and the extended conductive layer form a tab, at least one connecting hole passing through the tab region or passing through the tab region and the extended conductive layer, wherein a conductive structure is infilled in the at least one connecting hole;
wherein the current collector further comprises a second conductive layer covering the second surface, the second extended surface is not provided with the second conductive layer, and
wherein the tab being bent toward the second conductive layer to form a bending region.

2. The current collector of claim 1, wherein the current collector further comprises an additional tab, wherein the additional tab is spaced from the tab.

3. The current collector of claim 1, wherein the current collector further has at least one communicating hole passing through the main region, or passing through the main region and at least one of the first conductive layer and the second conductive layer.

4. The current collector of claim 1, wherein the current collector further has at least one communicating hole passing through the main region or passing through the main region and the first conductive layer.

5. The current collector of claim 4,
wherein a second conductive structure is infilled in each of the at least one communicating hole.

6. An electrode plate comprising:
an active layer; and
a current collector comprising:
an insulating substrate comprising:
a main region comprising a first surface and a second surface facing away from the first surface; and
a tab region extending outwardly from an end portion of the main region, the tab region comprising a first extended surface and a second extended surface, the first extended surface extends from the first surface, and the second extended surface extends from the second surface, at least one connecting hole passing through the tab region or passing through the tab region and the extended conductive layer, wherein a conductive structure is infilled in the at least one connecting hole;
wherein a first conductive layer is formed on the first surface and an extended conductive layer is formed on the first extended surface;
wherein the tab region and the extended conductive layer form a tab;
wherein the active layer is disposed on a surface of the first conductive layer facing away from the insulating substrate; and
wherein the current collector further comprises a second conductive layer covering the second surface, the second extended surface is not provided with the second conductive layer, and
wherein the tab being bent toward the second conductive layer to form a bending region.

7. The electrode plate of claim 6, wherein the current collector further comprises an additional tab, wherein the additional tab is spaced from the tab.

8. The current collector of claim 6, wherein the current collector has at least one communicating hole passing through the main region or passing through the main region and the first conductive layer.

9. The electrode plate of claim 6,
wherein the active layer is further disposed on a surface of the second conductive layer facing away from the insulating substrate.

10. The electrode plate of claim 9, wherein the current collector further has at least one communicating hole passing through the main region, passing through the main region and at least one of the first conductive layer and the second conductive layer, or passing through the main region, the active layer and at least one of the first conductive layer and the second conductive layer.

11. An electrode assembly comprising:
a first electrode plate;
a second electrode plate; and
a separator sandwiched between the first electrode plate and the second electrode plate; wherein the first electrode plate, the separator and the second electrode plate are stacked or wound to form the electrode assembly;
wherein the first electrode plate comprises:
an active layer; and
a current collector comprising:
an insulating substrate comprising:
a main region comprising a first surface and a second surface facing away from the first surface; and
a tab region extending outwardly from an end portion of the main region, the tab region comprising a first extended surface and a second extended surface, the first extended surface extends from the first surface, and the second extended surface extends from the second surface, at least one connecting hole passing through the tab region or passing through the tab region and the extended conductive layer, wherein a conductive structure is infilled in the at least one connecting hole;
wherein a first conductive layer is formed on the first surface and an extended conductive layer is formed on the first extended surface;
wherein the tab region and the extended conductive layer form a tab;
wherein the active layer is disposed on a surface of the first conductive layer facing away from the insulating substrate; and
wherein the current collector further comprises a second conductive layer covering the second surface, the second extended surface is not provided with the second conductive layer, and
wherein the tab being bent toward the second conductive layer to form a bending region.

12. The electrode assembly of claim 11, wherein the current collector further has at least one communicating hole passing through the main region or passing through the main region and the first conductive layer.

13. The electrode assembly of claim 11, wherein an active layer is further disposed on a surface of the second conductive layer facing away from the insulating substrate.

14. The electrode assembly of claim 13, wherein the current collector further has at least one communicating hole passing through the main region, passing through the main region and at least one of the first conductive layer and the second conductive layer, or passing through the main region, the active layer and at least one of the first conductive layer and the second conductive layer.

* * * * *